Patented Nov. 1, 1932

1,885,401

UNITED STATES PATENT OFFICE

ELLIOT RITCHIE ALEXANDER, OF ORLANDO, FLORIDA, ASSIGNOR, BY MESNE ASSIGNMENTS, TO THE VITAMIN COMPANY OF AMERICA, A CORPORATION OF FLORIDA

HOMOGENIZED CITROUS FRUIT CONCENTRATE

No Drawing. Application filed July 28, 1930. Serial No. 471,419.

The present invention relates to an homogenized citrous fruit concentrate adapted for use as such or as a base or ingredient of foods, confections and beverages, and to a process for preparing the same from fresh citrous fruit.

It is generally accepted that the flavor and/or the aroma of fresh oranges or other fresh citrous fruits, is due largely to the presence of some component or components which in the fruit when the juice of orange or other citrous fruit is concentrated by evaporation, either in an open kettle or in vacuo, is or are largely lost or altered; also, the color of the juice is materially altered.

An object of the present invention is to provide a concentrate of orange, grapefruit, lemon, tangerine, kumquat or other citrous fruit, in which concentrate the original color is maintained and the natural flavor and aroma are retained. Another object of invention is to provide a food product consisting essentially of citrous fruit, in which product the valuable ingredients and properties of fresh oranges or other citrous fruits are preserved to a high degree while separating out much of the water content of the fruit. Still other objects of invention include the provision of a fluid concentrate of citrous fruit in which the solids (i. e., the content of pulp) do not separate from the aqueous portion upon standing, which fluid concentrate may or may not contain sugar syrup or other additions.

The above, and other objects of invention are realized by carrying out my process which, as illustrated in the production of an orange concentrate from fresh whole oranges, comprises the following essential and optional steps, all of which may be and preferably are conducted in the cold, or at room temperature, and at atmospheric pressure:

1. Fresh oranges are crushed whole, as by passing the whole fruits through a crushing means equivalent to that used in the crushing of sugar cane, the so-separated peel oil and aqueous portion of the juice co-mingling with the pulp, the greater part of the squeezed rind with a certain amount of the seeds being discarded;

2. From the resulting fluid product consisting of pulp, juice and oil, with a certain residue of seeds and rind, are separated the seeds and residue of rind, as by passing the said fluid product into and through a revolving screen of suitably large mesh to retain the seeds and rind but pass liquids and particles smaller than the seeds, the material retained by this screen being discarded;

3. The resulting "juice," consisting essentially of pulp particles, peel oil, and the aqueous portions of the oranges, is then subjected to a separation operation dividing most of the aqueous portion and the oil from the pulp which latter then contains roughly 40 percent of the liquid content of the juice. This operation advantageously may be effected by passing the juice through a revolving screen of finer mesh than that employed in the foregoing operation and selected as to the size of its openings to pass the greater part of the liquid, but retain the pulpy constituents of the juice. An 80-mesh screen has been found to be suitable;

4. The separated liquid (consisting essentially of oil and aqueous solution of the water-soluble constituents of the fruit) is subjected to a more drastic separation treatment, as by passing the same one or more times through a centrifugal separator of the Sharples type or other centrifugal separator of suitable design and speed, whereby to remove at least the greater portion of the peel oil from the liquid mixture. Since separation of the orange peel oil from the aqueous portion is only partial in one passage of the liquid through the separator, that separated portion which is predominately aqueous may be again run through the separator for further or final removal of its residual oily content. The oil thus obtained may either be packaged in suitable containers for sale as "cold pressed orange oil", or at least a portion thereof may be returned to the pulp product for fortifying or restoring aroma and flavor. In this operation of separating oil from aqueous portions of the liquid, there is collected in the bowl of the centrifugal separator a semi-solid turbid or opaque, waxy, material of yellow color which for convenience may be called orange wax or orange resin. It separates, on long standing, into a lower whitish and more solid layer and an upper clear, yellow layer. This material in toto is soluble in a variety of organic solvents including alcohol, ethylene glycol and other suitable glycol derivatives;

5. The screened pulp obtained in operation 3 above is then subjected to homogenization treatment whereby to reduce and make uniform the size of the solid particles. This operation advantageously may be effected by passing the pulp through a homogenizer or colloid mill of conventional type.

The resulting product is a palatable orange concentrate having the characteristic flavor and aroma of the fresh orange, and containing the physiologically valuable constituents of the orange pulp together with a material amount of the water-soluble constituents of the fruit. The original color has not been altered. Furthermore, the orange concentrate does not separate into layers upon standing in its container.

The concentrate which is from 4 to 8 times more concentrated than crude pressed juice (that is, it can be diluted, with suitable sweetening, 4 to 8 times to produce a beverage simulating crude pressed juice) contains some aqueous solution of citric acid (free or as acid salts), some fruit sugar, and vitamins A, B and C (less, however, of vitamin C, which latter for the greater part is found in the separated juice), the oils of the pulp, and all the natural color and cellulosic material of the fruit. Preferably, there shoud be added to it a small but effective amount of an acceptable preservative such, for instance, as sodium benzoate.

Should a concentrate having a more pronounced or accentuated orange flavor and aroma be desired, the following step may be practiced:

6. To the homogenized pulp concentrate is added by thorough admixture a suitable amount of the orange resin obtained in step 4 above. The admixture of the orange resin with the homogenized pulp concentrate may be effected by dissolving the desired amount of the resin in an appropriate solvent (e. g., ethylene glycol) and stirring the resulting solution into the said pulp concentrate, after which I may and preferably do, again subject the product to homogenization treatment.

Where a more pronounced or accentuated tartness is desired in the orange concentrate, the same may be effected by the addition thereto of a suitable amount of citrous fruit juice rich in citric acid (e. g., juice of lemon, grapefruit, or the like), or an equivalent amount of citric acid.

While the product described in the foregoing is itself an article of commerce, it may be found advantageous to incorporate into the same sugar syrup in that amount which normally would be added by the dispenser of a fruit beverage. This I effect by the following operation:

7. A sugar syrup, which may but need not have the same specific gravity as that of the aforesaid concentrate, is separately prepared from dextrose, sucrose, maltose, or other suitable sugar or sugar-rich edible material; the syrup is clarified, as by filtration or centrifugation; the clarified syrup is introduced cold or at room temperature into the orange concentrate with suitable agitation or mixing; and the resulting mixture is subjected to homogenization treatment as above described. Under general conditions the particles of the homogenized pulp concentrate remain in stable suspension in the product; if, however, in a particular instance, there is a tendency for particles to settle, this condition may desirably be altered by adding to the pulp product a sugar syrup having the same specific gravity as the pulp.

As will be obvious, some variation in sequence of steps, and some latitude in operation, may be resorted to without departing from this invention. Thus, for instance: the proportion of solid to liquid constituents in the pulp concentrate may be varied within rather wide limits whereby to vary the consistency or fluidity of the product. Again, it is immaterial when the optional citric acid addition be made so long as it does not precede the drastic separation treatment, or centrifugation, and is followed (directly or indirectly) by homogenization. Or, where both orange resin and sugar syrup are to be added, the orange resin may be introduced into the concentrate using the syrup as the vehicle.

It will be obvious, also, that the process may be practiced upon another citrous fruit than orange; or, upon a mixture of citrous fruits whereby to provide a mixed citrous fruit concentrate.

I claim:

1. Process for making a citrous fruit concentrate which comprises crushing whole fresh citrous fruits, rejecting the rind and the seeds, separating from the resulting fluid material at least about one-half of its oily and aqueous liquid content, adding to the resulting fluid material a small but effective amount of citrous fruit resin, and subjecting the product to homogenization treatment.

2. Process which comprises separating, from the pulpy product resulting from crushing whole fresh citrous fruits and discarding the seeds and rind, a substantial amount of its normally liquid aqueous and oily content, separately preparing a sugar syrup, adding a suitable amount of the syrup to the product, and subjecting the mixture to homogenization treatment whereby to produce a stable and homogeneous fluid citrous fruit concentrate.

3. As a new product a stable homogeneous fluid consisting essentially of the homogenized isolated pulp and a portion of the normally liquid content of fresh citrous fruit.

4. As a new product a stable homogeneous fluid consisting essentially of the homogenized isolated pulp and a portion of the normally liquid content of fresh citrous fruit and containing isolated citrous fruit resin in solution.

5. As a new product a stable homogeneous luid consisting essentially of the homogenized isolated pulp and a portion of the normally liquid content of fresh citrous fruit and containng added sugar in solution.

6. As a new product a stable homogeneous fluid consisting essentially of the homogenized isolated pulp and a portion of the normally liquid content of fresh citrous fruit and containing isolated citrous fruit resin and added sugar in solution.

In testimony whereof, I affix my signature.

ELLIOT RITCHIE ALEXANDER.